H. T. NAKAMIZO.
AUTOMOBILE TOP RAISING AND LOWERING DEVICE.
APPLICATION FILED MAR. 5, 1918.

1,361,606.

Patented Dec. 7, 1920.
7 SHEETS—SHEET 2.

INVENTOR.
H. T. Nakamizo.
BY
Strong & Townsend
ATTORNEYS.

H. T. NAKAMIZO.
AUTOMOBILE TOP RAISING AND LOWERING DEVICE.
APPLICATION FILED MAR. 5, 1918.

1,361,606.

Patented Dec. 7, 1920.
7 SHEETS—SHEET 6.

INVENTOR.
H. T. Nakamizo
BY Strong & Townsend
ATTORNEYS.

UNITED STATES PATENT OFFICE.

HIROTSUNE T. NAKAMIZO, OF LOS ANGELES, CALIFORNIA.

AUTOMOBILE-TOP RAISING AND LOWERING DEVICE.

1,361,606. Specification of Letters Patent. Patented Dec. 7, 1920.

Application filed March 5, 1918. Serial No. 220,453.

*To all whom it may concern:*

Be it known that I, HIROTSUNE T. NAKAMIZO, a subject of the Emperor of Japan, residing at Los Angeles, in the county of Los Angeles and State of California, have invented new and useful Improvements in Automobile-Top Raising and Lowering Devices, of which the following is a specification.

This invention relates to an automobile top raising and lowering device and particularly to improvements on the mechanism shown in my co-pending application entitled "Automobile top raising and lowering device", filed February 27th, 1917, Ser. No. 151,180.

One of the objects of the present invention is to provide a simple, easily applied attachment for automobile tops which makes it possible for one person to raise or lower the top without assistance.

Another object of the invention is to provide means for raising and lowering the top by power and in conjunction therewith to provide manually actuated means for applying the power and automatic means for disconnecting the power drive the moment the top has reached either the raised extended position or the lowered folded position.

Further objects will hereinafter appear.

The invention consists of the parts and the construction and combination of parts as hereinafter more fully described and claimed, having reference to the accompanying drawings, in which—

Figure 1:
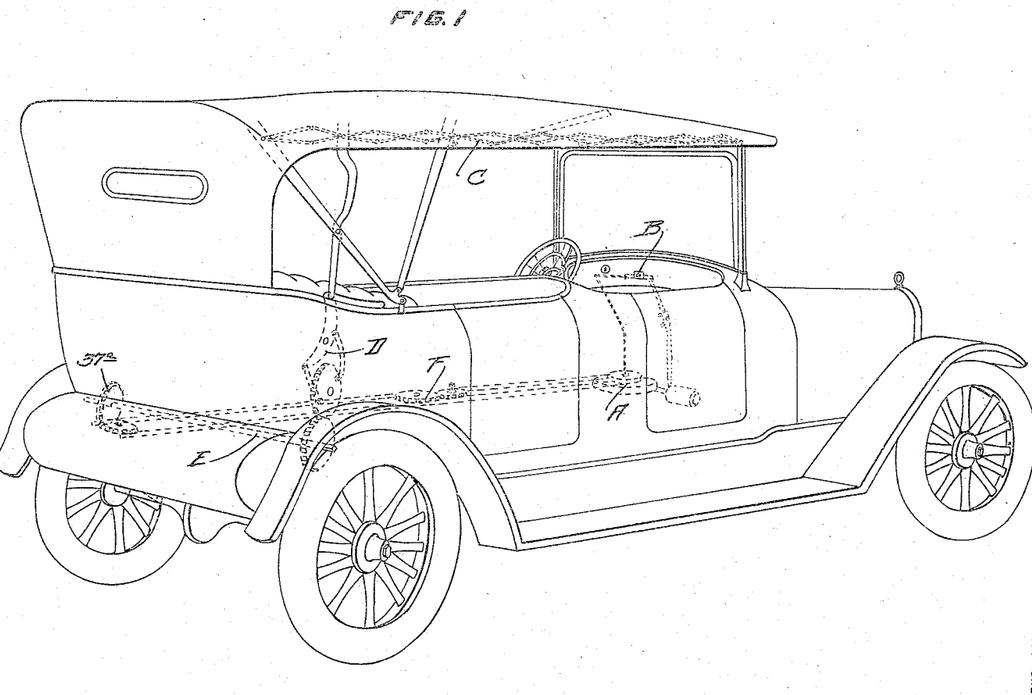
Figure 1 is a perspective view of an automobile showing the application of the invention.
Figures 2, 3, 4:
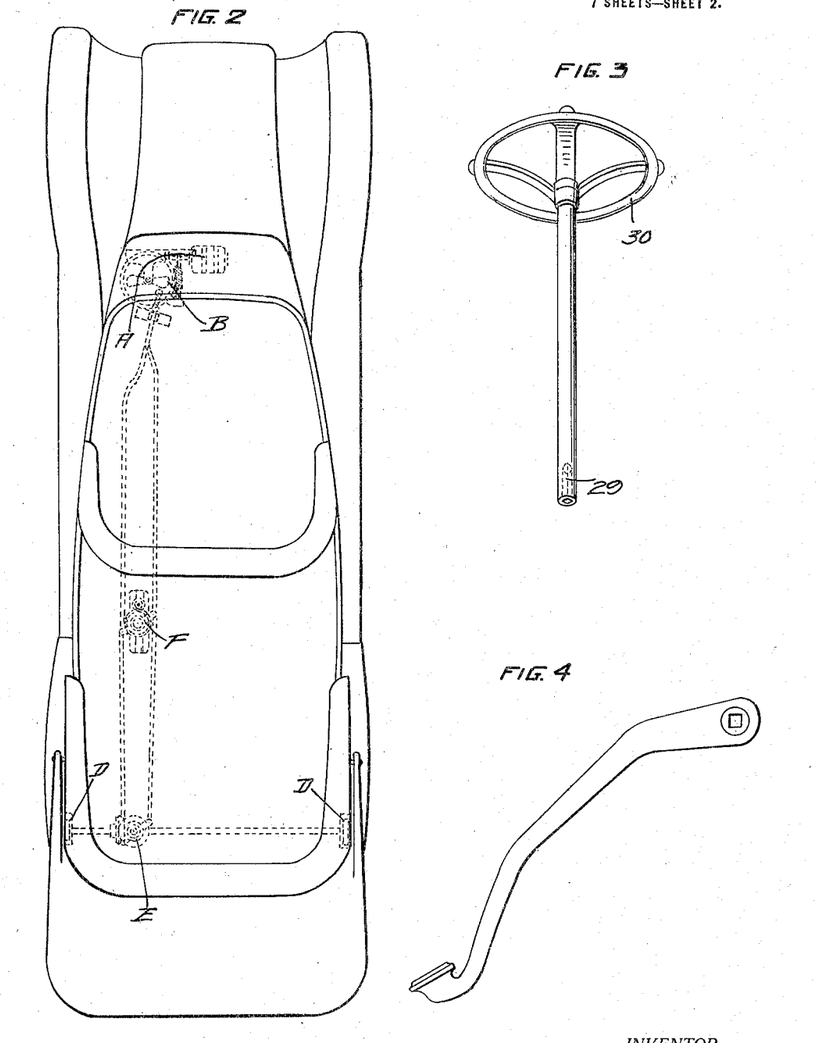
Fig. 2 is a plan view of same.
Fig. 3 is a perspective view of a hand wheel by which power may be applied to raise or lower the top.
Fig. 4 is a side elevation of the foot lever by which power may be applied for raising or lowering the top.

Referring to the drawings in detail and particularly to Figs. 1 and 2, it might be stated that the mechanism consists of a power unit, generally indicated at A, an actuating mechanism B for throwing the power into or out of operation, a top structure C, a link mechanism D for raising and lowering the top, a gear transmission E for operating the mechanism D, and a second gear mechanism F for manually applying power to raise and lower the top.

The driving unit employed in the present instance consists of a motor, generally indicated at A. This motor consists of a casing 2, interiorly of which is mounted a spring 3. One end of the spring is secured to a shaft 4 which is journaled in bearing brackets 5, while the opposite end of the spring is secured to the interior of the casing proper. Secured on the upper end of the shaft is a bevel gear 6, and intermeshing with said gear and journaled on one side of the automobile body is a second gear 7, the shaft of which is provided with a squared shank 8 for the reception of a cranking handle 9. Power applied by the crank 9 revolves the shaft 4 and thereby winds the spring and the spring when thus wound is locked against unwinding by means of a pawl and ratchet, such as shown at 10.

Formed on the lower end of the casing 2 is a bevel gear 11, and intermeshing with said gear is a bevel gear 12 which is secured on the shaft 13. Also secured on the shaft 13, which is suitably journaled in bearings 14, is a bevel gear 15, and intermeshing with said gear is a bevel pinion 16 through which power is transmitted to drive a ball governor 17. The gears 11, 12, 15 and 16 are merely provided for driving the governor and this in turn serves the function of regulating the unwinding speed of the spring motor, as will hereinafter be described.

Secured on the upper end of the casing 2 of the spring motor and turnably mounted with relation to the shaft 4 is a pair of cam members 18 and 19. Suitably journaled in a bearing member 20 secured below the floor of the automobile, or in any other suitable position, is a spur gear 21 and secured directly to said gear or a shaft which carries the gear is an arm 22. Connected with the ends of the arm 22 is a pair of push rods 23 and 24, one for each end of the arm. The forward ends of these rods are slidably mounted in a bearing bracket 25 and each rod is provided with a roller 26$^a$ which is adapted to be alternately engaged by the cams 18 and 19; the roller 26 carried by the rod 24 being engaged by the cam 18 while the roller 26$^a$ carried by the rod 23 is adapted to be engaged by the cam 19.

Intermeshing with the gear 21 is a spur pinion 27. This gear is secured on a shaft, the upper end of which is squared, as at 28, to receive a socket wrench 29 attached to a hand wheel 30 (see Fig. 3). This socket wrench may be applied to the shank 28 to rotate the gears 27 and 21, if for any reason the spring motor is out of order, thus making it possible to raise or lower the top either manually or by power. Also connected with the arm 22 is a pair of links 31 and 32. The opposite ends of these links are connected to an arm 33, similar to the arm 22, and this arm is also secured to a gear, in this instance a bevel gear such as shown at 34.

Disposed transversely of the automobile, above the gear 34, is a shaft 35, and secured on said shaft and intermeshing with the bevel gear 34 is a bevel gear 36. Secured on each end of the shaft 35 is a spur gear 37 and intermeshing with each spur gear 37 (see Fig. 14) is a mutilated gear 38, to which is attached a pair of links 39. The opposite ends of these links are pivotally attached to a lever 40 which is pivotally mounted on a plate 41 secured in one side of the automobile, and this lever is in turn attached to the lower end of an arm 42 which is pivotally attached, as at 43, to one of the main bow arms 44 which supports the top C.

The top structure may consist of any suitable number of bows and toggle links, such as shown, but the essential feature is the provision of the lazy tong links 45 which cause the bow arms and toggle links to become extended or folded when the top is raised or lowered by means of the arm 42. The mechanism shown in Fig. 14 is duplicated; that is, a similar mechanism is located on the opposite side of the car, the mechanism on one side being driven by the gear 37 and the mechanism on the opposite side by the gear 37$^a$.

Figure 5:
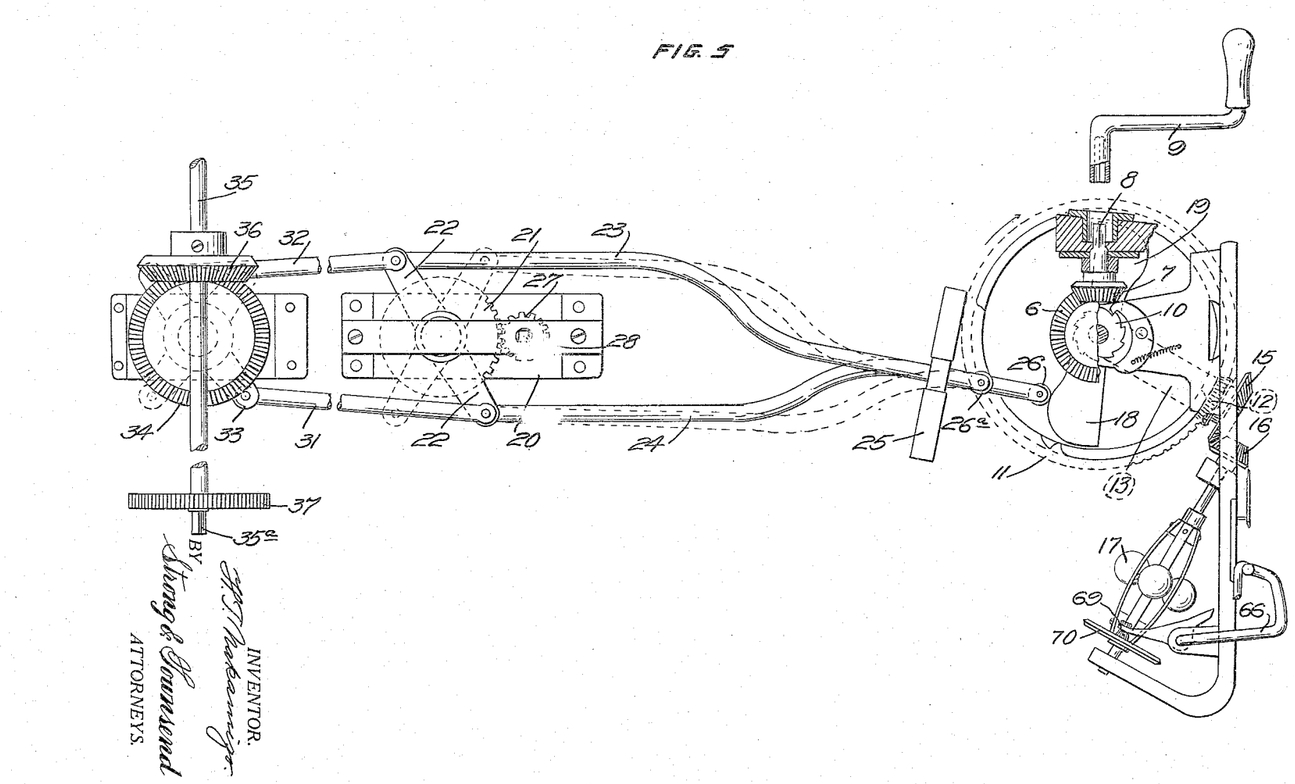
Fig. 5 is a plan view of the spring motor and the governor by which the speed of the motor may be regulated, said plan view also showing how power is transmitted from the spring motor to revolve the rear driving shaft either in one direction or the other.
Figure 6:
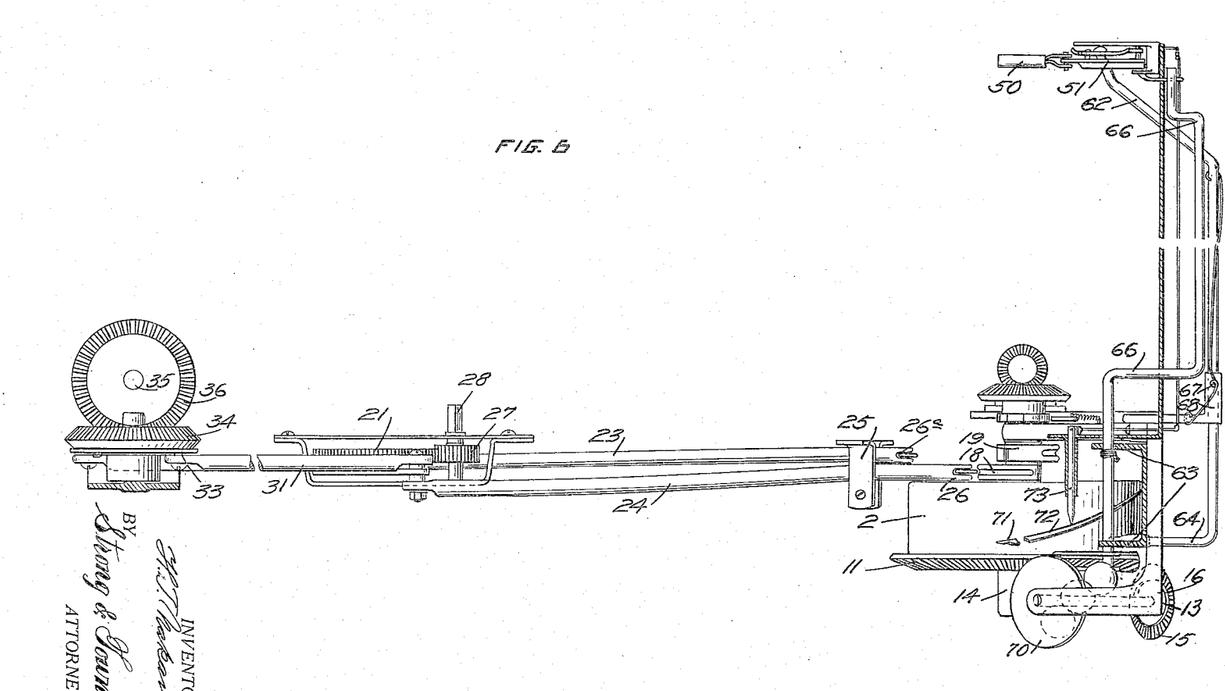
Fig. 6 is a side elevation of Fig. 5, this view also including a side elevation of the starting mechanism which is manually operated when power is to be applied.
Figure 7:
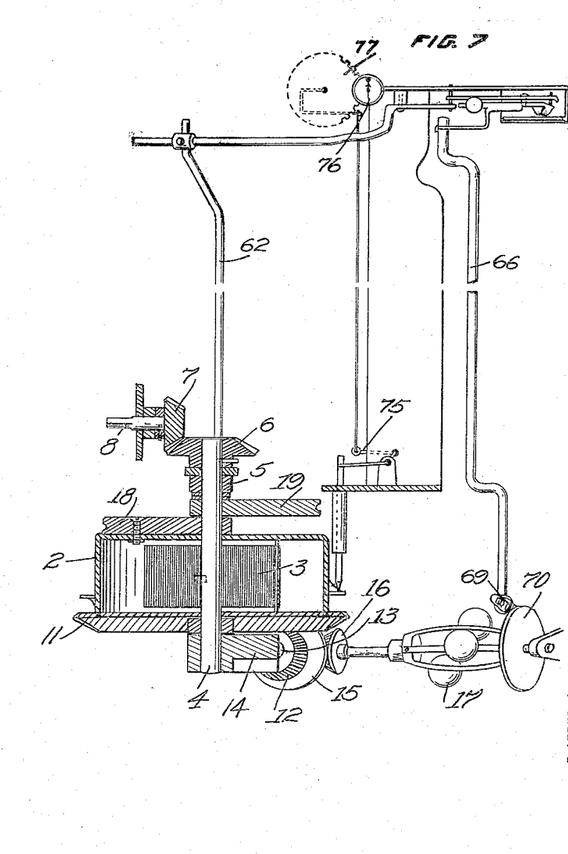
Fig. 7 is an end view partly in section of the spring motor and the mechanism by which it is actuated.
Figures 14, 15, 16, 17:
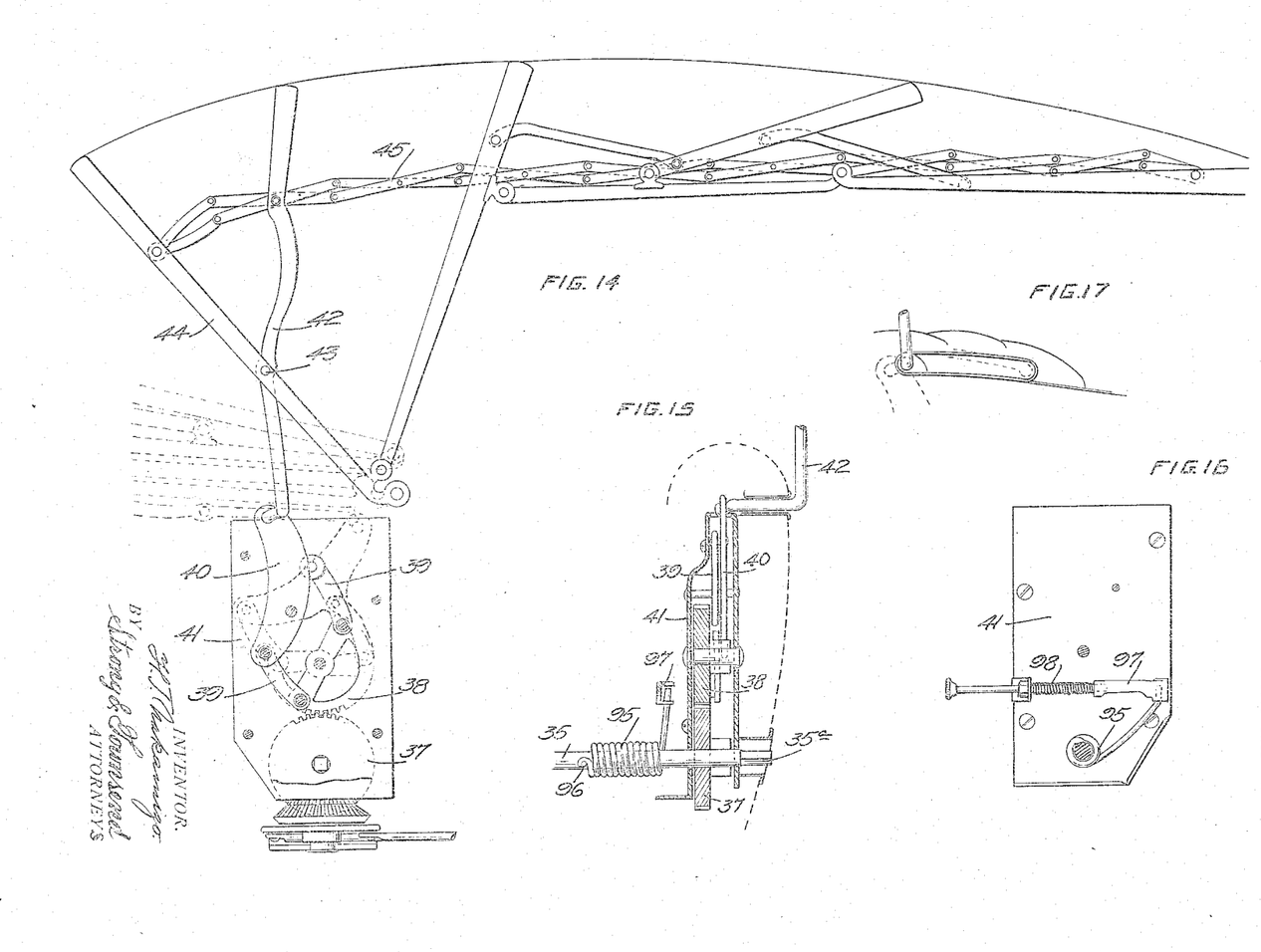
Fig. 14 is an enlarged detail view in side elevation, showing the mechanism whereby the top is raised and lowered.
Fig. 15 is an end view of the lower part of Fig. 14, partly in section.
Fig. 16 is a side elevation of the spring stop.
Fig. 17 is a side elevation of the automobile body, showing the position of the slot in which the raising arm of the top moves.

By referring to Figs. 5 and 14 it can readily be seen that rotation transmitted to gear 21 in one direction or the other will be transmitted through the links 31 and 32 to partially rotate the gear 34. This movement is in turn transmitted to the gear 36 which will rotate the shaft 35 and the gears 37. The gears 37 in turn transmit movement to the mutilated gears 38 and power is transmitted to the lever 40 which either raises or lowers the top. The mechanism comprising the gears 37 and 38 and the links 39 connecting the same with the levers 40 is all contained in the body portion between the main exterior and the upholstery work, such as shown in Fig. 15. The whole mechanism is supported by the plates 41 which also serve as journals for the shaft 35.

Power for rotating the shaft 35 in one direction or the other to raise or lower the top may be applied by means of the hand wheel shown in Fig. 3 through the pinion 27. It may also be applied by means of a foot lever, such as shown in Fig. 4, which may be applied to either end of the shaft 35 as the exterior ends are provided with square shanks, as shown at 35$^a$, but it is, of course, intended that the top should be raised and lowered by means of power derived from the spring motor. The hand wheel and the foot lever are therefore only provided as emergency devices.

One of the cams carried by the spring motor, when engaging the push rod, transmits power to raise the top, while the other cam transmits power to lower the top. A half of a revolution of the spring motor is therefore required to raise the top and a half of a revolution is required to lower the top. The cam 18 when engaging the rod 24 pushes this in a forward direction or to the dotted line position shown in Fig. 5. The opposite rod 23 being connected to the opposite end of the arm 22 will move in the opposite direction and will thus be in a position to engage the cam 19 when this has made a half of a revolution. The mechanism is, therefore, always ready or in position for the operation intended and it is only necessary to provide means for applying the power of the spring motor to accomplish the work intended.

The motor in the present instance is manually started by pressing the push-button 50 (see Figs. 6, 7, 8 and 9). This button is attached to a triangular-shaped plate 51 which is pivotally mounted, as at 52, on a cover plate 81. The plate 51 normally assumes the full line position shown in Fig. 8 and assumes the dotted line position when the push-button is depressed.

Figure 9:
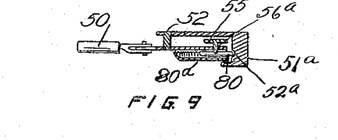
Fig. 9 is a cross section of the mechanism to which the push-button is attached.
Figure 10:
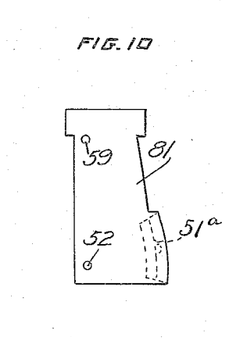
Fig. 10 is a plan view of a plate which forms a covering for the mechanism shown in Figs. 8 and 9.

The cover plate 81 is provided with a downwardly extending flange 51ª which is arcual in form as shown by Figs. 9 and 10. A tubular extension 80ª is formed on the lower side of the plate 51 having one end closed. To the closed end of this tubular extension there is secured one end of a coil spring 81ª, the other end of the coil spring being secured to the one end of a plunger or latch member 80. In the inner side surface of the flange 51ª a depression or recess 52ª is provided in which the outer end of the plunger 80 is adapted to engage and seat when brought into alinement therewith.

A second triangular plate 57 is pivotally attached to the cover plate 81 as at 59. Between the plates 51 and 57 there is provided an L-shaped link member 55, said link member having its one arm slotted as at 56 to straddle a pin 57 carried by the plate 58 and its other end carrying a pin 56ª which extends through a slot 54 in the plate 51 and has its lower end pivotally connected to the plunger 80.

Figure 8:
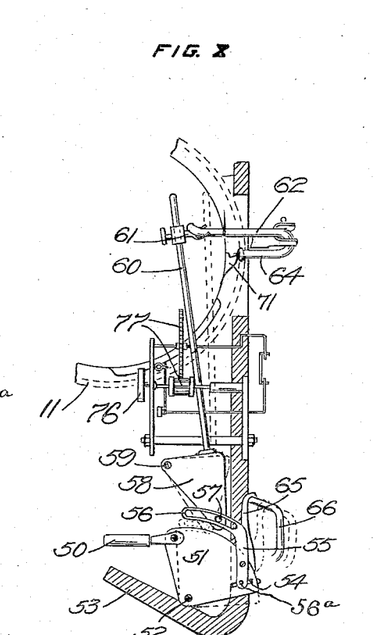
Fig. 8 is a plan view of the push-button and the mechanism actuated thereby.
Figure 13:
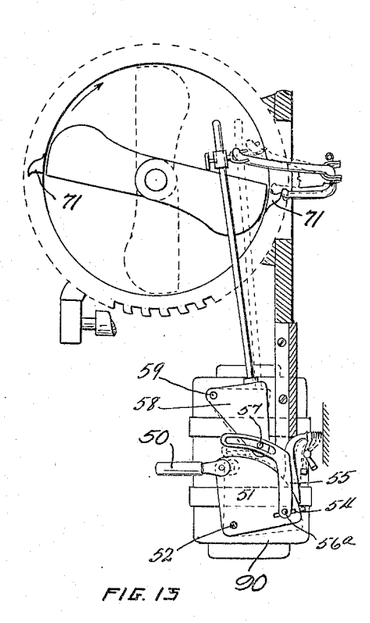
Fig. 13 is a plan view of same.

When the plate 51 is moved to its dotted line position as shown in Figs. 8 or 13 the plunger 80 is brought into alinement with the recess 52ª and in which the outer end of said plunger will seat under the pressure of the spring 81ª. Also during this downward movement of the plate 51 the link member 55 will engage the flange 51ª of the cover plate 81 and move the link to the dotted line position shown, said link drawing with it the plate 57 and rod 60 secured thereto, to their dotted line positions. The rod 60 has secured to its outer end a fork 61 which straddles a releasing lever 62. This lever is pivotally mounted as at 67 in the bracket 68 and when moved forward by the rod 60 corresponding to the dotted line position in Fig. 8, its end 64 engages with one of the lugs 71 on the motor casing when the motor revolves to that point. The momentary engagement of said lug and said lever pushes back the whole releasing rod 62. The rod 60 also returns to its original position; that is, from the dotted line to the full line which in turn moves the plate 57 to its original position. The plate 57 pulls on the one end of the link 55 which in conjunction with the pressure on the middle portion of the link against the flange 52ª of the cover plate 81, moves the outer end of the link inwardly thereby lifting the end of the plunger 80 from the depression or recess 52ª and permitting the plate 51 and link 55 to return to their original or full line position.

An extension 65 is formed on the lower side of the plate 51 and serves to engage the upper end of a lever 66 which is journaled in a bracket 63. This lever may be termed the governor brake lever as the lower end is provided with a shoe 69 which engages a disk 70 formed on the governor. When the push button is depressed and the plate 51 brought forward, the extension 65 swings the releasing lever 66 to the dotted line position indicated in Fig. 8. This movement of the lever 66 moves the shoe 69 away from the governor disk and permits the spring motor to start. The governor, of course, regulates the speed by pulling the disk up against the brake shoe if the speed becomes too great.

A forward motion of the plate 51 has also brought the end of the member 64 of the lever 62 into position to be engaged by the lug 71, when the spring motor revolves to that point, as previously described. When the lug 71 engages the end of lever 62, the latch member 80 is released and the plate 51 returns to its normal position. This return movement of the plate 51 returns the lever 66 to its full line position (Fig. 8) and thereby again drawing the shoe 69 against the governor disk and bringing the spring motor to a stop.

The operation above described, of starting and stopping the spring motor, constitutes one complete operation in lowering or raising the automobile top; that is, as has been previously described, the spring motor turns one-half of a revolution and during which interval, one of its cams 18 or 19, engages the end, either of the lowering rod 23 or raising rod 24, and said rod is moved forward, whereby the required movement is given to actuating the beveled gear 34 for either raising or lowering the automobile top. One of the cams 18 or 19 will always be in position when the motor stops.

I have also provided an indicating means which obviates the necessity of watching the raising or lowering of the top. This is accomplished by providing a cam track 72 on the spring motor casing, which operates a rod 73. This rod rises on the cam 72 when the motor casing rotates and as it is connected through a series of bell cranks, as shown at 75 (Figs. 7 and 8), it can readily be seen that if an indicator such as shown at 76, is connected therewith, it becomes possible to visibly indicate when the top has been completely raised or lowered, the indicator being driven through the links and lever 75 and a pair of gears 77 (Fig. 8).

The push-button, when depressed to swing the plate 51 to the dotted line position shown, may be locked immediately, by a spring-actuated latch member 80 which engages a notch formed in the cover plate 81 (see Figs. 9 and 10). The whole mechanism is returned to normal position the moment one of the lugs 71 comes into operation as the swinging of the releasing lever 62 back to releasing position positively returns all members to normal position.

Figure 11:
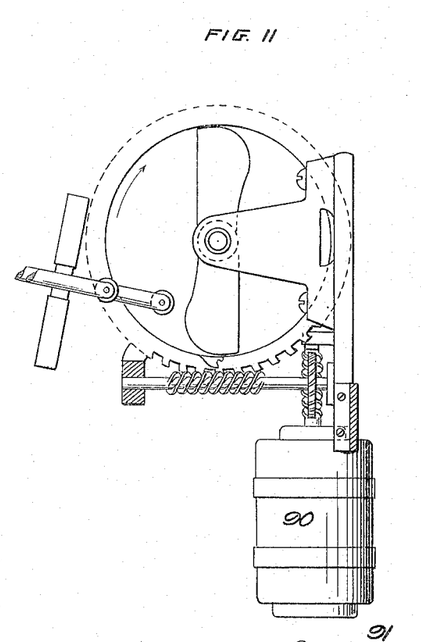
Fig. 11 is a modification, showing the mechanism driven by an electric motor.
Figure 12:
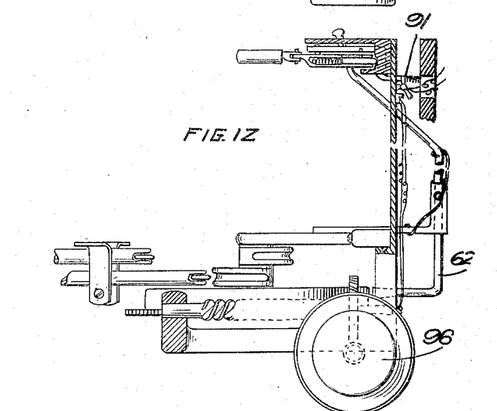
Fig. 12 is an end view of the same partly in section.

While the mechanism as a whole is here shown as driven by a spring motor, it is obvious that any other power may be employed. For instance, by referring to Figs. 11, 12 and 13, it can be seen that an electric motor 90 has been provided. The mechanism operated by the push-button 50 will in this instance serve to make and break a circuit through a switch 91 and as the releasing lever 62 is also employed in this instance, it can readily be seen that it automatically breaks the circuit when engaged by the lugs 71 as this forcibly returns the remaining mechanism to normal position.

By referring to Figs. 15 and 16, it will be seen that the rear driving shaft 35 is surrounded by a coil spring 95. One end of this spring is attached to a pin 96 on the shaft while the opposite end is secured to an adjustable bracket 97. This bracket may be adjusted by means of a screw 98 to increase or decrease the tension of the spring. The spring serves the function of partially supporting the weight of the top and the bows supporting same, that is, the spring is under a high tension when the top is lowered and under least tension when the top is raised. The spring may in this manner serve the function of supporting the top in any position, this being of particular advantage if the spring motor is out of order and it is necessary to raise or lower the top by the foot lever or hand wheel previously described.

The mechanism illustrated in Fig. 14 forms no part of the present invention as this has already been fully illustrated in my co-pending application referred to. I, therefore, wish it understood that the driving mechanism, either manually operated or driven by power, forms the subject-matter of the present application and that while a more or less specific form of mechanism has been shown I wish it understood that the materials and finish of the several parts and the construction of same may be such as the experience and judgment of the manufacturer may dictate.

By referring to the general construction and mechanism employed, it will be seen that the top will remain in any intermediate position either during the raising or lowering operation and that comparatively little power is required for either operation, as the spring 95 serves as a counterbalance which materially assists the raising operation of the top and checks it when lowered. The power or gear ratio employed is approximately ten to one, thus further decreasing the amount of power required.

Having thus described my invention, what I claim and desire to secure by Letters Patent is—

1. The combination with an automobile top, of means for raising and lowering same, a motor, means for transmitting power from the motor to operate the top raising and lowering mechanism, said means comprising a pair of cam members adapted to be rotated by the motor, push rods adapted to be reciprocated by means of the cams, means for manually starting the motor, and means for automatically stopping the motor.

2. The combination with an automobile top, of a driving shaft, means actuated by said driving shaft for raising the top when the shaft is rotated in one direction and for lowering the top when the shaft is rotated in the opposite direction, a gear on the shaft through which power is transmitted to rotate the shaft, a second gear intermeshing with said gear, a pair of links connected with said gear, a motor, a pair of cams adapted to be rotated by the motor, one cam adapted to actuate one link and the second cam the second link, said cams during the rotation of the motor adapted to reciprocate the links, and means for stopping and starting the motor.

3. The combination with an automobile top, of a driving shaft, means actuated by said driving shaft for raising the top when the shaft is rotated in one direction and for lowering the top when the shaft is rotated in the opposite direction, a gear on the shaft through which power is transmitted to rotate the shaft, a second gear intermeshing with said gear, a pair of links connected with said gear, a centrally pivoted arm, means connecting said links one with each end of the arm, a pair of push-rods, one connected with each end of the arm, a pair of cams, one for each arm, a motor adapted to rotate the cams, manually operated means for starting the motor, and means for automatically stopping the motor.

4. The combination with an automobile top, of a driving shaft, means actuated by said driving shaft for raising the top when the shaft is rotated in one direction and for lowering the top when the shaft is rotated in the opposite direction, a gear on the shaft through which power is transmitted to rotate the shaft, a second gear intermeshing with said gear, a pair of links connected with said gear, a centrally pivoted arm, means connecting said links one with each end of the arm, a gear secured to said arm, a second gear intermeshing with said gear, and means for manually rotating the last named gear in one direction or the other.

5. The combination with an automobile top, of a driving shaft, means actuated by said driving shaft for raising the top when the shaft is rotated in one direction and for lowering the top when the shaft is rotated in the opposite direction, a gear on the shaft through which power is transmitted to rotate the shaft, a second gear intermeshing with said gear, a pair of links connected with said gear, a centrally pivoted arm, means connecting said links, one with each end of the arm, a pair of push-rods, one connected with each end of the arm, a pair of cams, one for each arm, a motor adapted to rotate the same, manually operated means for starting the motor, means for automatically stopping the motor.

6. The combination with an automobile top, of a driving shaft, means actuated by said driving shaft for raising the top when the shaft is rotated in one direction and for lowering the top when the shaft is rotated in the opposite direction, a gear on the shaft through which power is transmitted to rotate the shaft, a second gear intermeshing with said gear, a pair of links connected with said gear, a centrally pivoted arm, means connecting said links, one with each end of the arm, a pair of push-rods, one connected with each end of the arm, a pair of cams, one for each arm, a motor adapted to rotate the cams, manually operated means for starting the motor, means for automatically stopping the motor, a governor connected with the motor adapted to regulate its speed, said manually operated means comprising a push-button, a stop member on the motor, a crank-arm adapted to be moved out of engagement with the stop lug when the push-button is depressed to permit the motor to start, and a second lug adapted to engage the crank arm and throw it into engagement with the stop lug when the motor has revolved a predetermined distance.

7. The combination with an automobile top, of a driving shaft, means actuated by said driving shaft for raising the top when the shaft is rotated in one direction and for lowering the top when the shaft is rotated in the opposite direction, a gear on the shaft through which power is transmitted to rotate the shaft, a second gear intermeshing with said gear, a pair of links connected with said gear, a centrally pivoted arm, means connecting said links one with each end of the arm, a pair of push-rods, one connected with each end of the arm, a pair of cams, one for each arm, a motor adapted to rotate the cams, manually operated means for starting the motor, means for automatically stopping the motor, a governor connected with the motor adapted to regulate its speed, said manually operated means comprising a push-button, a stop member on the motor, a lever adapted to be moved out of engagement with the stop lug when the push-button is depressed to permit the motor to start, a second lug adapted to engage the crank arm and throw it into engagement with the stop lug when the motor has revolved a predetermined distance, a brake shoe adapted to engage a disk rotated by the governor, and means actuated by the push-button for throwing the brake shoe into or out of engagement with the governor disk.

8. The combination with an automobile top, of a driving shaft, means actuated by said shaft for raising the top when it is rotated in one direction, and for lowering the top when it is operated in the opposite direction, a spring motor adapted to rotate in one direction, a pair of cams adapted to rotate in unison with the spring motor, means for transmitting movement from said cams to rotate the driving shaft alternately first in one direction and then in the other, and means for starting and stopping the motor at predetermined positions.

9. The combination with an automobile top, of a driving shaft, means actuated by said shaft for raising the top when it is rotated in one direction and for lowering the top when it is operated in the opposite direction, a spring motor adapted to rotate in one direction, a pair of cams adapted to rotate in unison with the spring motor, means for transmitting movement from said cams to rotate the drive shaft alternately, first in one direction and then in the other, manually actuated means for starting the motor when the top is to be either raised or lowered, and means for automatically stopping the motor the moment the top has been completely raised or completely lowered.

10. The combination with an automobile top, of a driving shaft, means actuated by said shaft for raising the top when it is rotated in one direction and for lowering the top when it is operated in the opposite direction, a spring motor adapted to rotate in one direction, a pair of cams adapted to rotate in unison with the spring motor, means for transmitting movement from said cams to rotate the drive shaft alternately, first in one direction and then in the other, manually actuated means for starting the motor when the top is to be either raised or lowered, means for automatically stopping the motor the moment the top has been completely raised or completely lowered, and manually operated means independent of the motor for raising or lowering the top.

11. The combination with an automobile top, of a driving shaft, means actuated by said shaft for raising the top when it is rotated in one direction and for lowering the top when it is operated in the opposite direction, a motor adapted to rotate in one direction, means for transmitting power from said motor to rotate the shaft alternately, first in one direction and then in the opposite direction, a gear adapted to rotate in unison with the spring motor, a governor driven by said gear, a stop lever adapted to normally engage a lug on the motor casing, a push-button adapted to rock the lever out of engagement with the lug to permit the motor to rotate, and means for automatically throwing the lever into engagement with the lug to permit the lug to rock the lever and set a brake which stops the motor against rotation when the motor has rotated a predetermined distance.

12. The combination with an automobile top, of a driving shaft, means actuated by said shaft for raising the top when it is rotated in one direction and for lowering the top when it is operated in the opposite direction, a spring motor adapted to rotate in one direction, a pair of cams adapted to rotate in unison with the spring motor, means for transmitting movement from said cams to rotate the driving shaft alternately first in one direction and then in the other, a gear adapted to rotate in unison with the spring motor, a governor driven by said gear, a stop lever adapted to normally engage a lug on the motor casing, a push-button adapted to rock the lever out of engagement with the lug to permit the motor to rotate, and means for automatically throwing the lever into engagement with the lug to permit the lug to rock the lever and set a brake and the governor to stop the motor against rotation when the motor has rotated a predetermined distance.

In testimony whereof I have hereunto set my hand.

HIROTSUNE T. NAKAMIZO.